United States Patent [19]
Hopwell

[11] 4,378,173
[45] Mar. 29, 1983

[54] STRUCTURAL JOINTS

[75] Inventor: Ernest E. Hopwell, Rugby, England

[73] Assignee: Linvar Limited, Leicester, England

[21] Appl. No.: 191,771

[22] Filed: Sep. 29, 1980

[51] Int. Cl.³ .............................................. F16B 7/10
[52] U.S. Cl. .................................. 403/108; 248/188.5
[58] Field of Search ............... 403/104, 109, 108, 110; 248/188.5, 423

[56] References Cited

U.S. PATENT DOCUMENTS 3,053,355  9/1962  Attwood ............................... 403/22
3,222,095 12/1965  Gerus ................................... 403/104
3,701,506 10/1972  Farreau ............................. 248/188.5

FOREIGN PATENT DOCUMENTS 296520  9/1928  United Kingdom ................ 248/423

Primary Examiner—Wayne L. Shedd
Attorney, Agent, or Firm—Buell, Blenko, Ziesenheim & Beck

[57] ABSTRACT

A structural joint suitable for a frame member for furniture, e.g. a leg for a work bench, comprises two tubular members 10, 11 slidable one inside the other. Each member 10, 11 has a longitudinal slot 13 through which a wing nut 16 is passable. The members are secured by engaging a screw 17 in the nut 16 which is so long that it cannot fully rotate inside the inner member 11. Preferably, the slot 13 has enlarged portions 14 which alone can pass a boss of the nut 16.

2 Claims, 4 Drawing Figures

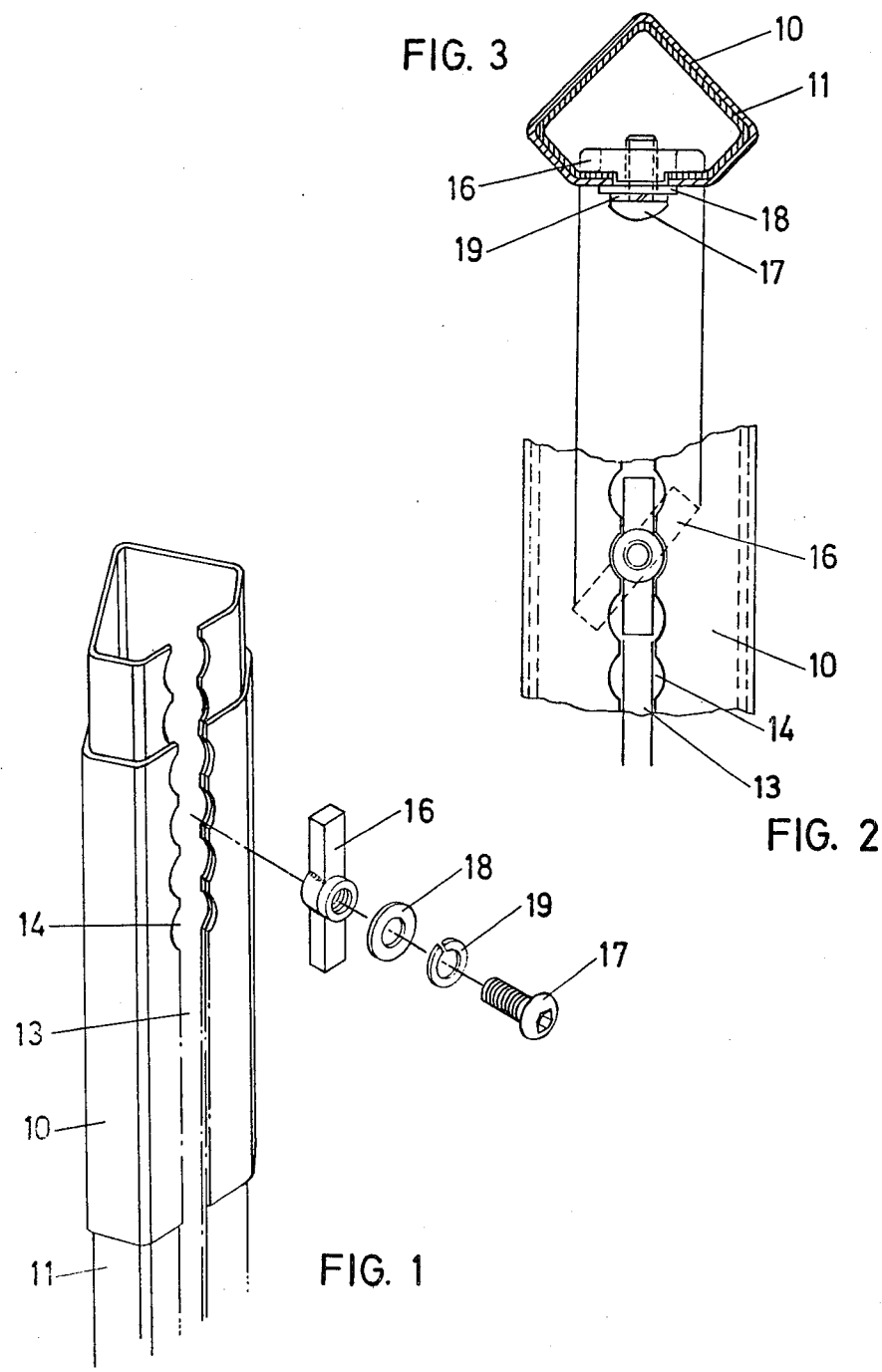

STRUCTURAL JOINTS

DESCRIPTION

The invention relates to structural joints for load bearing members, for example for a frame member for furniture or a leg for a work bench.

The invention provides a structural joint comprising two tubular members, one member being a longitudinally slidable fit inside the other and each member having a longitudinal slot, and securing means comprising a wing nut passable through the slot in both members and long enough to be not fully rotatable inside the inner member and a screw engageable in the nut.

Preferably, the slots in the members have a number of enlarged portions, and the wing nut comprises a boss passable through such enlarged portions.

The combined length of structural members comprising such a joint can be adjusted by sliding the members longitudinally with respect to each other. Preferably the slots in the two members are similar, and the boss on the wing nut can only pass through where enlarged portions of the slots are aligned. The combined length can be further adjusted with the wing nut inside the members, and secured by tightening the screw in the nut.

The tubes preferably have a transverse section which is generally square but with one corner cut off, the latter conveniently providing an inside face of a leg or a work bench.

DRAWINGS

FIG. 1 shows a joint according to the invention in an "exploded" condition;

FIG. 2 is an elevation of the main part of the joint of FIG. 1 with screw omitted for clarity;

FIG. 3 is a section perpendicular to FIG. 2; and

Figure 4:
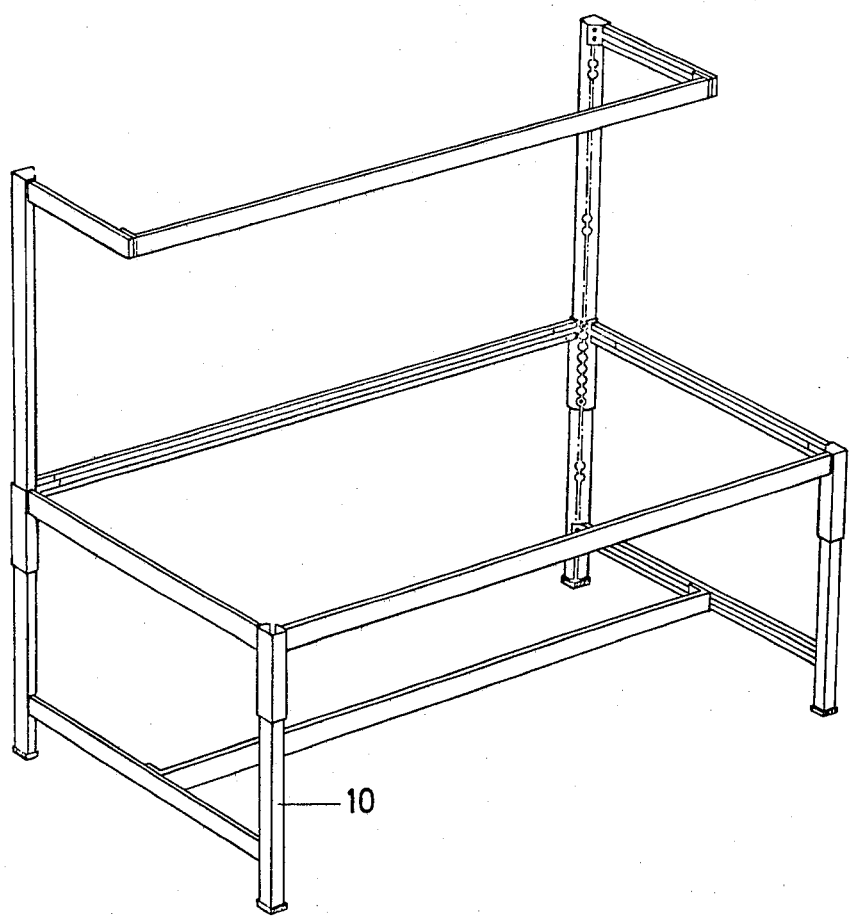
FIG. 4 shows schematically a perspective view of a work bench with the top removed for clarity, each leg of which comprises a joint according to FIG. 1.

With particular reference to FIG. 1, the joint comprises an outer tubular member 10 and an inner tubular member 11 a longitudinally slidable fit therein. Both members 10 and 11 have a similar longitudinal slot 13 therein with a number of enlarged portions 14 spaced along the slot 13. Securing means comprises a wing nut 16 passable through the slot 13 and a screw 17 engageable therein. A plain washer 18 and a split ring 19 are provided on the shank of the screw 17.

In use, the tubes are mutually longitudinally adjusted as in FIG. 1 so that the enlarged portions 14 of the slots 13 coincide. The screw 17 is passed through the split ring 19 and washer 18, and engaged a short way in the wing nut 16. The wing nut 16 is passed through the slot 13 with its boss through an enlarged portion 14. Rotation of the screw 17 turns the nut 16 until it jams against the inside of the inner member 11 and can be rotated no further. With the screw 17 and nut 16 thus retained, the length of the members can be further adjusted before the screw 17 is tightened and the members 10, 11 thus secured.

I claim:

1. A structural joint comprising an outer tubular member, an inner tubular member fitting and longitudinally slidable inside the outer member, a registering longitudinal slot in each member, a wing nut passable through the slots and long enough to be not fully rotatable inside the inner member, and a screw engageable in the nut and having a head bearing on the edges of the outer member for securing the members together, the tubular members have a transverse section which is generally square with one corner cut off to provide an inclined face and the longitudinal slots are in that face.

2. A structural joint according to claim 1 in which the slots in the tubular members have a number of enlarged portions and the wing nut comprises a boss passable through such enlarged portions.

* * * * *